United States Patent
Roschat et al.

(10) Patent No.: US 7,000,974 B2
(45) Date of Patent: Feb. 21, 2006

(54) HOOD CONNECTION FOR THE HOOD STAYS ON MOTOR VEHICLE HOODS

(75) Inventors: Bernd Roschat, Nordermeldorf (DE); Lorenz Wahl, Hamburg (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 11/128,714

(22) Filed: May 13, 2005

(65) Prior Publication Data

US 2005/0206190 A1    Sep. 22, 2005

Related U.S. Application Data

(63) Continuation of application No. PCT/EP03/13053, filed on Nov. 21, 2003.

(30) Foreign Application Priority Data

Dec. 17, 2002   (DE)   ................................ 102 59 234

(51) Int. Cl.
*B60J 7/08*    (2006.01)

(52) U.S. Cl. .................. 296/122; 296/107.01; 296/108

(58) Field of Classification Search ........... 296/107.01, 296/107.16, 107.17, 108, 120.1, 121
See application file for complete search history.

(56) References Cited

U.S. PATENT DOCUMENTS

| 780,141 A | 1/1905 | Thomas |
| 1,654,132 A | 12/1927 | Lewis et al. |
| 6,585,310 B1 * | 7/2003 | Guillez et al. .............. 296/121 |

FOREIGN PATENT DOCUMENTS

| DE | 3405920 C2 | 12/1985 |
| DE | 199 16 692 A1 | 5/2002 |
| DE | 100 23 047 C2 | 6/2002 |
| GB | 81 06 535.3 | 3/1982 |
| GB | 90 04 986.1 | 8/1990 |

* cited by examiner

*Primary Examiner*—Lori L. Coletta
(74) *Attorney, Agent, or Firm*—Brooks Kushman P.C.

(57) ABSTRACT

A supporting bearing for connecting the bows of a soft-top convertible vehicle to the folding linkage. A bearing spike is integrally formed on a linkage arm. A sleeve-shaped insert body is latched to a bearing spike. The insert body is received in an opening in the bow.

17 Claims, 2 Drawing Sheets

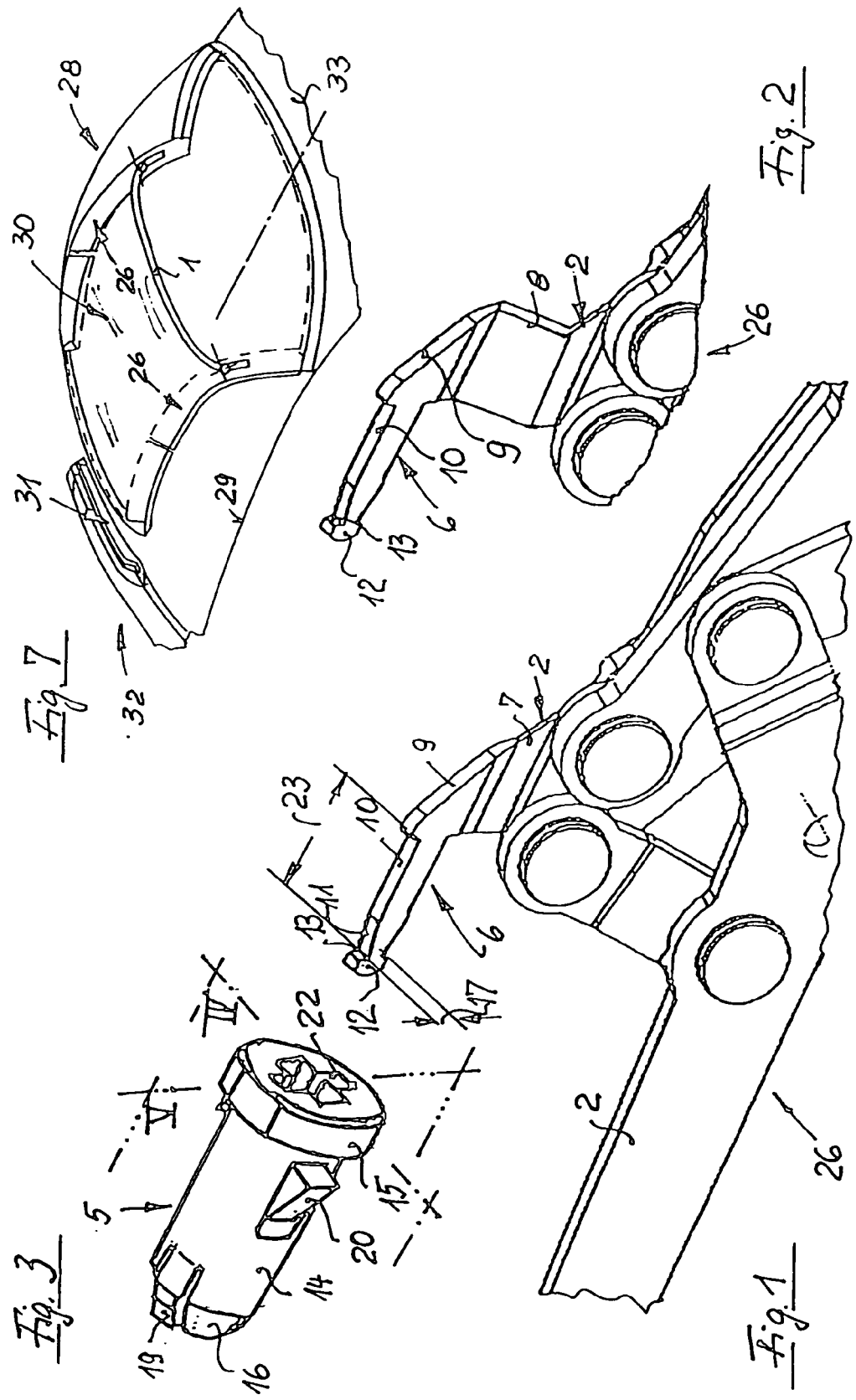

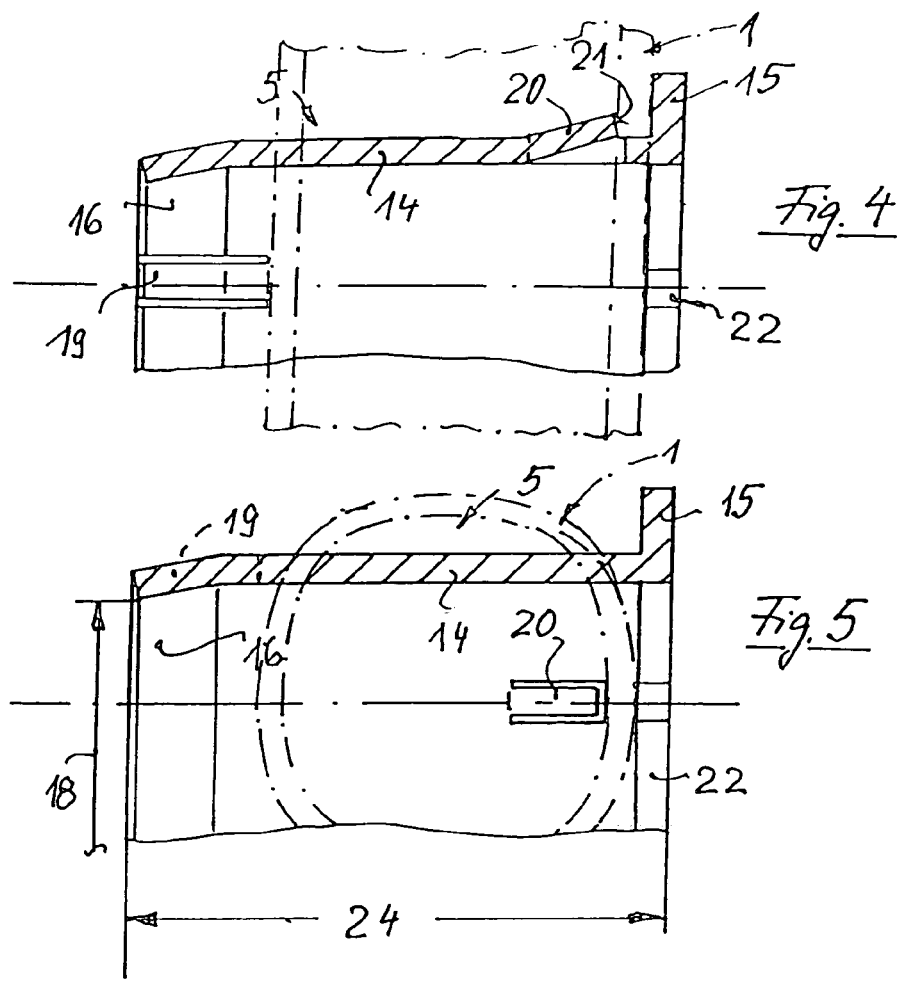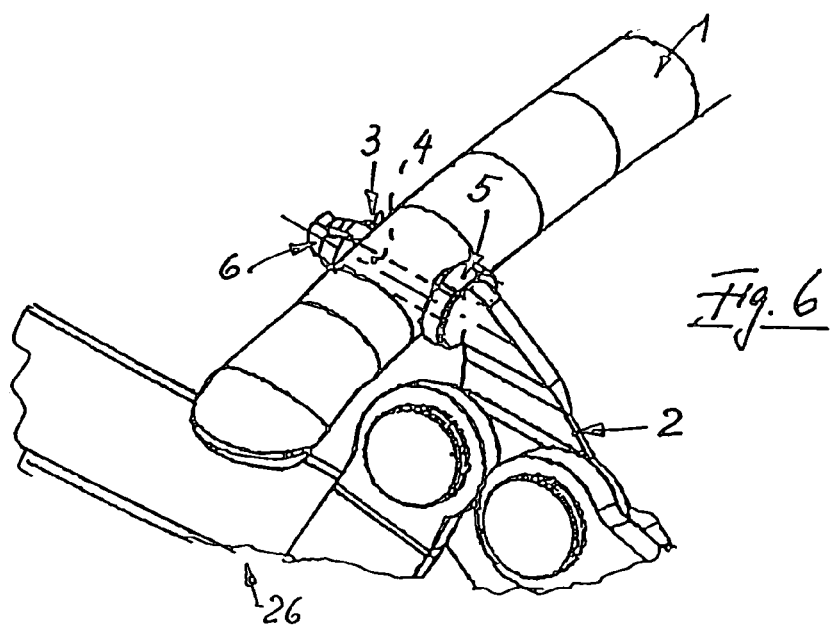

HOOD CONNECTION FOR THE HOOD STAYS ON MOTOR VEHICLE HOODS

CROSS-REFERENCE TO RELATED APPLICATION

This is a continuation of PCT application Ser. No. PCT/EP2003/013053, filed Nov. 21, 2003, to which priority is claimed.

BACKGROUND OF THE INVENTION

1. Field of the Invention

This invention relates to a connector for securing a top stack linkage to transversely extending bows of a convertible top.

2. Background Art

One example of a linkage connection for a cover for a truck is disclosed in German Patent DE 90 04 986 U1. In this patent, supporting linkages extend across the loading space forming part of the cover frame. The loading space of the particular vehicle is covered by a tarpaulin that is supported by soft-top bows in the region covering the loading space. Bearing spikes terminate in a tapered portion. The distance between the soft-top and the loading area of a commercial vehicle is generally greater than an operator can reach. Depending on the particular cargo, soft-tops together with soft-top bows have to be removed to enlarge the loading height or to facilitate loading. The supporting bearing is designed to allow the soft-top bows to be assembled onto and detached from the bearing spikes. The bearing spikes taper toward the leading end. The taper in the transition to the leading end. This solution is matched to specific requirements of linkage connections in commercial vehicles and is not suitable for permanent connections between supporting linkages and soft-top bows.

Another example of a linkage connection for soft-top linkages of commercial vehicles is disclosed in German Patent DE 81 06 535 U1. In this patent, the longitudinal regions between the soft-top bows is supported on lateral extending supporting linkages. Additional longitudinal poles run parallel to the lateral supporting linkages and are connected to the soft-top bows. The poles have slot-shaped sockets that run in the longitudinal direction and engage the longitudinal poles by means of angled, cross-sectionally adapted, hook-shaped clips. This approach results in a relatively difficult assembly operation.

German Patent DE 100 23 047 C2 discloses providing soft-top bows with an opening for receiving supporting bearings. The bow has a hollow profile within which part of the supporting bearing is captively inserted into the receiving opening.

Linkage connections for soft-top linkages are disclosed in German Patent DE 199 16 692 A1 for passenger vehicles having folding soft-tops. The soft-top bows are connected by supporting bearings to longitudinal supporting linkages. The attachment of the soft-top bows to the supporting folding linkages is problematic because the folding linkages are generally very complex. The sequence of movement between opening and closing the soft-top and structural design space constraints must satisfy stringent requirements. The attachment of the soft-top bows to the folding linkages must also meet demands for a structural form which is as simple as possible, easy to install, and functions in the best possible manner.

This invention is directed to developing a linkage connection to the bows of a convertible top that address the above problems and meet the strict requirements for passenger vehicle convertible tops.

SUMMARY OF THE INVENTION

According to one aspect of the invention, a soft-top convertible for a passenger vehicle is disclosed that has a folding linkage made up of linkage arms to which supporting bearings are secured. A bearing spike is formed on each linkage arm that is received in a plug-in opening in the side of a bow. The bearing spikes and supporting bearings extend into the opening and are secured in the opening by latching elements. The supporting bearing may be provided economically and is particularly advantageous with regard to the space required. This supporting bearing offers advantages for installation and also service. The insert body has a dowel-like design and is inserted into the plug-in opening on the bow side. The insert body latches against the bow, on one hand, and the bearing spike, on the other hand, which further facilitates installation and also facilitates rapid removal for service, if required. In addition, tolerances between the parts to be fitted can be compensated for by the insert body to ensure good running properties with a rattle-free fit.

Furthermore, corrosion problems may be addressed by the material properties of the insert. This is particularly true if the insert body is designed as a sleeve-shaped plastic clip.

Integrally forming the bearing spike as part of the associated linkage arm is particularly expedient when the linkage arm has a flat profile. The bearing spike may be hooked out or cut out of the flat profile to protrude over the edge of the arm, which is particularly advantageous for manufacturing. In addition, it is possible to obtain spatial advantages as to the extent of the bearing spike in the pivoting plane of the arm or as to the lateral offset of the bearing spike. For example, a bracket-like connection may be provided between the bearing spike and the linkage arm. A bracket-like support may also be formed, for example, by a bent region of the linkage arm.

The bearing spike has portions that may deviate from the pivoting plane of the linkage arm. For example, the bearing spike may be hooked out or project laterally with respect to the arm. This simplified attachment of the bearing spike to the soft-top bow may be provided at a lower cost.

The dowel-like design of the insert body facilitates attachment to a soft-top bow having a hollow body. The plug-in opening may be formed simply by forming a continuous hole in the bow. The latching mechanism can also be realized in a particularly simple manner. The insert body may be fixed relative to the bow by providing a collar on the side of the bow near the end. A latching mechanism may be provided that cooperates with the collar. The opposite end of the dowel-like insert body may protrude over the bow profile in the region of the latching hooks. The latching hooks form the latching mechanism and are expanded by the bearing spike. The latching hooks are backed by the head of the bearing spike with the insert body being clamped or at least axially secured with respect to the bearing spike.

Further details and features of the invention are defined by the claims. The invention is described in greater detail below with reference to the illustrated embodiments.

BRIEF DESCRIPTION OF THE DRAWINGS

FIG. 1 is a fragmentary perspective view of a longitudinal region of a soft-top folding linkage on the longitudinal side having linkage arms which are connected to one another, can be pivoted in relation to one another and of which one is provided with a bearing spike which is situated, as part of a supporting bearing, in the attachment of a soft-top bow to a soft-top folding linkage on the longitudinal side;

FIG. 2 is a fragmentary perspective view of an alternative embodiment of the bearing spike with respect to a linkage arm of the soft-top folding linkage;

FIG. 3 is a perspective view of a dowel-like insert body of a supporting bearing;

FIG. 4 is a cross-sectional view taken along the line IV—IV in FIG. 3;

FIG. 5 is a cross-sectional view taken along the line V—V in FIG. 3;

FIG. 6 is a fragmentary perspective view showing the attachment of a soft-top bow to a linkage arm of the soft-top folding linkage with a supporting bearing; and FIG. 7 is a fragmentary perspective diagrammatic view of the roof region of a convertible passenger vehicle with a folding soft-top, the soft-top linkage of the top has lateral folding linkages that extend in the longitudinal direction relative to the vehicle and are connected by transversely extending soft-top bows.

DETAILED DESCRIPTION OF THE PREFERRED EMBODIMENT(S)

Referring to FIG. 7, a roof region 28 of a passenger vehicle is illustrated. A belt line 29 of the convertible vehicle is provided with a folding soft-top 30. In the closed position, the soft-top 30 covers the vehicle interior. The front side of the top 30 is connected to a header 31 of a windshield 32. The rear side of the top 30 is level with the belt line 29 and adjacent to a rear covering 33 of the vehicle body. The folding soft-top 30 has, as indicated, soft-top folding linkages 26 that extend along the longitudinal sides of the top 30. The linkages 26 are formed by linkage arms 2, as shown in FIGS. 1 and 2, that can be pivoted in relation to one another. As shown in FIGS. 6 and 7, the linkages are connected in the transverse direction by soft-top bows 1. FIG. 7 shows this type of connection for one soft-top bow, but it should be understood that generally a plurality of such soft-top bows 1 are provided over the roof region.

Referring to FIG. 1, a portion of a soft-top folding linkage 26 is illustrated. A correspondingly design region is provided on the other side of the vehicle that is symmetrical with respect to the longitudinal central plane of the vehicle. A plurality of linkage arms 2 of the soft-top folding linkage 26 converge and, with respect to the desired pivotability of the soft-top 30 between an open and a closed position, are connected kinematically to one another.

Referring to FIG. 6, the connection of one folding linkage 26 to a soft-top bow is illustrated. The two longitudinal sides of the soft-top are connected by the soft-top bow 1, which runs in the transverse direction of the vehicle. The soft-top bow 1 is connected to a linkage arm 2 of the soft-top folding linkage by a linkage connection that comprises a supporting bearing 3. A plug-in opening 3 (illustrated by dashed lines) is provided on the side of the soft-top bow 1. The opening 4 receives a dowel-like insert body 5. As shown in FIG. 6, the insert body 5 receives a bearing spike 6 that is provided on the linkage arm 2.

As shown in FIG. 1, the bearing spike 6 extends forward in the longitudinal direction of the vehicle when the soft-top is in the closed position. The linkage arm 2 is attached to the bearing spike 6 by a bracket 7. The bracket 7 is a wall-side that extends from the bearing spike 6 toward the linkage arm 2.

FIG. 2 shows a modification of the above-described design, in which the bracket, which is now denoted by reference numeral 8, runs offset laterally obliquely upwards with respect to the plane of the linkage arm 2. Bracket 8 illustrates a solution in which the position of the bearing spike 6 differs from the arrangement illustrated in FIG. 1. The position of the bearing spike 6 can be varied depending on the design of the brackets 7 and 8 that serve as transition elements. Alternatively, the bearing spike 6 may run in the vertical direction, or in the transverse direction.

In the illustrated embodiments, the linkage arm 2 consists of flat member fabricated from sheet metal. Bracket 7 or 8 forms a projection on the edge of the arm that extends in a sheet-like manner in FIG. 1 and in an angled manner in FIG. 2. The bracket merges into a supporting shoulder 9 of the bearing spike 6. The supporting shoulder 9 is adjoined by a guide part 10, which is reduced in height and has the same cross section over its length. Guide part 10 is adjoined by tapered surfaces 11 that taper towards one another in the vertical direction and terminate in a head part 12. Head part 12 is expanded in the vertical direction to form step-shaped offsets 13. The height of the head part 12 preferably corresponds to the height of the guide part 10.

As shown in FIG. 3, the dowel-like plug-in body 5 is assembled onto the bearing spike 6. The plug-in body 5 in the exemplary embodiment has a circular cross section in the form of a sleeve 14 having a stop collar 15 at one end. The other end of the body 5 opposite the stop collar 15 has a conically tapering end section 16. The end-side diameter of the end section 16 corresponds, with reference to the bearing spike, approximately to the distance measured in the vertical direction between the surfaces 11 and the transition to the head part 12. The corresponding distances are indicated in FIG. 1 by reference numeral 17 for the bearing spike 6, and in FIG. 5 by reference numeral 18 for the sleeve 14.

In the region of the sleeve 14 that terminates at the end section 16, the sleeve 14 has mutually opposed tongue-shaped latching hooks 19. The latching hooks 19 preferably extend into the region that adjoins the head section 16 and extends toward the stop collar 15. Latch hooks 19 are formed by tongues that have been partially cut free. The sleeve 14 of the insert body 5 is provided with latching hooks 20 adjacent to the stop collar 15. The stop surfaces 21 of the latching hooks 20 are directed toward the stop collar 15. The stop surfaces 21 are formed by latching tongues which have been cut free in relation to the sleeve 14 and project outwardly relative to the circumference of the sleeve. The spacing between the stop surfaces 21 of the latching hooks from the stop collar 15 corresponds approximately to the wall thickness of the hollow profile of the soft-top bow 1. In FIGS. 4 and 5, the spacing between the stop surface 21 and the collar 15 is indicated by chain-dotted lines.

In the region of the stop collar 15, the insert body 5 has a lead-in opening 22 for the bearing spike 6. The lead-in opening is aligned with the end-side latching hooks 19. When the insert body 5 is assembled onto the bearing spike 6, the head part 13 of the bearing spike 6 backs up the latching hooks 19. Latching hooks 19 are supported against the offset 13 as stops. The bearing spike 6 has a length 23, which corresponds to the length of the sleeve. Length 23 is measured between the stop surfaces toward the supporting shoulders 9 and the offsets 13 in the transition to the head part 12.

Insert body 5 is assembled onto the bearing spike 6 and latched axially with respect thereto. Insert body 5 is assembled into corresponding plug-in opening 4 of the soft-top bow 1 and latched with respect to the soft-top bow 1. In this way, a supporting bearing provides a connection between the soft-top bow and linkage arm 2 of the soft-top folding linkage 26. The supporting bearing is distinguished by great simplicity and high reliability. The insert body 5—given an appropriate selection of material, preferably plastic—also provides the possibility of avoiding rattling noises and eliminating corrosion. The insert body compensates for tolerances in the bows 1 and linkages 26.

In particular, a simple approach is provided to adapt the supporting transverse width between corresponding supporting bearings. The insert body 5 may be simply matched to structural requirements. A linkage connection is provided for soft-top linkages of folding soft-tops 30 of passenger vehicles. The soft-top folding linkages 26 on the longitudinal sides of the soft-top 30 are formed by linkage arms 2. Soft-top bows 1 are secured to the linkage arms by supporting bearings 3. The soft-top bows extend in the transverse direction of the vehicle and each have, as part of the supporting bearings, a plug-in opening 4 that receives the insert body 5. The insert body 5 receives a bearing spike 6. Bearing spike 6 is formed on a linkage arm 2. The insert body 5 has a stop collar 15 that limits the depth that the insert body 5 may be inserted into the plug-in opening 4. The insert body 5 is supported by the bearing spike 6 near the stop collar. The insert body 5 is retained against the soft-top bow 1 via latching mechanisms that are axially spaced apart from one another and are formed by latching hooks 19, 20.

Insert body 5 is designed in a dowel-like manner as a sleeve body, and in particular, as a sleeve-shaped plastic clip. Insert body 5 forms a connecting element between a spike-like element, for example, a bearing spike 6, onto which the sleeve body 5 can be assembled. Insert body 5 has a hollow body defining a plug-in opening 4. The plug-in depth of the insert body 5 is limited by a stop collar 15 and latching hooks 19, 20. Hooks 19, 20 latch onto the spike-like element which contains the plug-in opening. In particular, latching hooks 19, 20 are axially spaced apart from one another. One of the hooks 19 or 20 is situated adjacent to the stop collar and is directed radially outwardly to the latter (FIG. 4). The other hook 19 or 20 is positioned radially inward and is supported in the opposite direction against the spike-like element, for example bearing spike 6.

It is also within the scope of the invention to provide soft-top bows that do not have hollow profiles. The solid soft-top bows are provided with plug-in openings that are connected by supporting bearings to associated linkage arms.

It is also within the scope of the invention to install the insert body first into the soft-top bow. Subsequently, the bearing spike may be assembled to the insert body 5 in the soft-top bow. Alternatively, the insert body 5 may be first assembled to the bearing spike 6 and then assembled to the soft-top bow. The latching hooks 19, if first assembled to the bearing spike 6, do not project over the circumference of the sleeve.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A linkage connection for soft-top linkages of motor-vehicle soft-tops, having supporting linkages assigned to the longitudinal sides of the soft-top and having soft-top bows which are secured against the latter via supporting bearings, run in the transverse direction of the vehicle, in each case have, as part of the supporting bearings, a plug-in opening for a bearing spike on the linkage side and are supported in a manner latching axially against the bearing spike passing through the plug-in opening, wherein the soft-top linkage is designed as a folding linkage for passenger vehicle folding soft-tops, and in that the supporting bearings in each case have an insert body which is plugged into the plug-in opening and receives the bearing spike which is formed on the linkage arm, and which has a stop collar, which delimits the plug-in depth into the plug-in opening, and, in the opposite direction to the stop collar, is supported against the bearing spike and the soft-top bow via latching mechanisms spaced apart axially from one another.

2. The linkage connection as claimed in claim 1, wherein the soft-top linkage has linkage arms which are formed by flat profiles and have an integral design with the respective bearing spike.

3. The linkage connection as claimed in claim 2, wherein the bearing spike is provided protruding over the edge of the respective linkage arm.

4. The linkage connection as claimed in claim 1, wherein the insert body is designed as a sleeve-shaped plastic clip.

5. The linkage connection as claimed in claim 1, wherein the latching mechanisms which are spaced apart axially from one another are provided adjacent to the stop collar, on the one hand, and to the opposite end of the insert body, on the other hand.

6. The linkage connection as claimed in claim 5, wherein the latching mechanisms are formed by latching hooks which are assigned on the circumference to the sleeve-shaped insert body.

7. The linkage connection as claimed in claim 6, wherein the latching hooks which are respectively positioned against the bearing spike and against the soft-top bow are positioned radially in opposite directions and are flexible.

8. The linkage connection as claimed in claim 1, wherein the soft-top bow has a hollow profile.

9. The linkage connection as claimed in claim 8, wherein the soft-top bow has a closed hollow-cylindrical profile.

10. The linkage connection as claimed in claim 8, wherein the plug-in opening on the bow side is formed by a hole passing through the hollow profile.

11. A sleeve-shaped, dowel-like insert body as connecting element between a spike-like plug-in body and a receiving body having a plug-in opening, into whose plug-in opening is to be inserted the insert body which has a stop collar, which delimits its plug-in depth, and, in order to latch it against the lug-in body and the receiving body, has latching elements which are spaced apart axially from one another and are directed in opposite directions, are positioned in a manner such that they are flexible radially and in opposite directions and of which the latching elements which are positioned radially outward lie adjacent to the stop collar.

12. The sleeve-shaped, dowel-like insert body as claimed in claim 11, wherein the plug-in body is designed as a bearing spike.

13. The sleeve-shaped, dowel-like plug-in body as claimed in claim 11, wherein the receiving body is designed as a hollow body.

14. The sleeve-shaped, dowel-like insert body as claimed in claim 11, wherein the distance between the stop collar and the latching element adjacent to the latter corresponds to the wall thickness of the hollow body.

15. The sleeve-shaped, dowel-like insert body as claimed in claim 11, wherein the latching elements which are spaced apart from the stop collar and are directed radially inward peter out toward that end of the insert body which is remote from the stop collar.

16. The sleeve-shaped, dowel-like insert body as claimed in claim 1, wherein the latching elements are formed by latching tongues which have been cut free.

17. In combination, first and second articulated linkages, each being made up of a plurality of links, a plurality of transversely extending bows, and bearings connecting the linkages to the bows, the combination comprising:

at least one bearing spike associated with one of the links;

the bearing having a sleeve-like configuration and being detachably secured over the bearing spike, the bearing further having latching elements disposed on the outer surface of the bearing that detachably secure the bearing to an opening in one of the bows.

* * * * *